United States Patent [19]

Lee et al.

[11] Patent Number: 5,267,865

[45] Date of Patent: Dec. 7, 1993

[54] INTERACTIVE COMPUTER AIDED NATURAL LEARNING METHOD AND APPARATUS

[75] Inventors: John R. Lee, 912 Constantinople St., New Orleans, La. 70115; John Alvendia, Metairie, La.

[73] Assignee: John R. Lee, Metairie, La.

[21] Appl. No.: 833,905

[22] Filed: Feb. 11, 1992

[51] Int. Cl.$^5$ ............................................. G09B 3/00
[52] U.S. Cl. ................................. 434/350; 434/307; 434/323; 434/362; 364/419.2; 395/927; 273/430; 273/433
[58] Field of Search ............... 434/169, 185, 178, 201, 434/307, 308, 322, 323, 335–337, 350, 362, 365; 364/419; 395/154, 927; 340/825.51, 825.5; 370/85.13, 85.14, 94.1, 94.3; 273/429–431, 433, 434

[56] References Cited

U.S. PATENT DOCUMENTS

| | | | |
|---|---|---|---|
| 4,798,543 | 1/1989 | Spiece | 434/323 |
| 4,820,167 | 4/1989 | Nobles et al. | 434/307 X |
| 4,891,633 | 1/1990 | Imazeki et al. | 370/124 X |
| 4,968,257 | 11/1990 | Yalen . | |
| 5,002,491 | 3/1991 | Abrahamson et al. | 434/350 X |
| 5,033,969 | 7/1991 | Kamimura | 434/323 X |
| 5,035,625 | 7/1991 | Munson et al. | 434/335 X |
| 5,065,345 | 11/1991 | Knowles et al. . | |
| 5,147,205 | 9/1992 | Gross et al. | 434/307 X |
| 5,170,362 | 12/1992 | Greenberg et al. | 434/323 X |
| 5,176,520 | 1/1993 | Hamilton | 434/350 |

OTHER PUBLICATIONS

"PS/2 MultiMedia for Microscopic Studies," IBM, 1991.
"Education Local Area Network and Tools (EdLAN)," IBM, 1991.
"IBM Personal Science Laboratory (PSL)," IBM Tools For Education, IBM, 1990.
IBM Software for Education Catalog, 1991/92 Edition.
"Discover the new world of effective instructional multimedia," Special Issue, IBM Multimedia, Supplement to T.H.E. Journal, Sep. 1991.

*Primary Examiner*—Richard J. Apley
*Assistant Examiner*—Joe H. Cheng
*Attorney, Agent, or Firm*—Burns, Doane, Swecker & Mathis

[57] ABSTRACT

An educational method and system for executing the method, to improve the efficiency of individual learning by monitoring the student's progress and pacing the course material to the student's ability to comprehend and learn. This method and system also reduces the teachers's administrative and paperwork burden. Interactive multimedia technology is combined with unique courseware development to provide a flexible teaching tool and student monitoring system.

23 Claims, 4 Drawing Sheets

Fig. 3

INTERACTIVE COMPUTER AIDED NATURAL LEARNING METHOD AND APPARATUS

BACKGROUND OF THE INVENTION

1. Field of the Invention

The present invention relates generally to educational methods at the classroom and individual level, as well as systems for implementing such methods. More particularly, the present invention relates to an educational method which combines audio-visual and computer technology to shift the teacher's role away from mass pupil instruction and paperwork and back to the more traditional role of helping each individual student with his or her unique educational difficulties.

2. State of the Art

Classroom teaching methods have changed very little since the early days of our country. The bedrock of education remains the teacher or professor lecturing to groups of students, commonly in conjunction with a text. Homework is assigned to reinforce the lessons learned in class and tests are administered to measure students' aptitude and retention of the material. At the early levels of education, the setting for this instruction has and continues to be the schoolroom, public or private, where a teacher is responsible for a group of, for example, fifteen to forty students.

The conventional classroom method of teaching a subject typically involves a lesson plan which includes a plurality of lectures each having an associated written homework assignment for the student to reinforce the lecture. The teacher collects and evaluates the homework and occasionally gives tests to measure the students' retention of the material. The teacher is also required to perform a multitude of other subsidiary tasks, such as report card generation and parent-teacher conferences, to keep the community satisfied with both the students' and the teacher's performance. Thus under the conventional classroom scenario, teachers must split their time to assume the roles of administrator and public relation officer, as well their supposedly primary role of teacher.

Educators have long recognized that while the classroom scenario provides economies of scale, one drawback is that students of different ages and aptitudes learn at differing rates and with the need for varying amounts of individual attention. This recognition led to the availability of private tutoring, for those who could afford such, provides more flexibility to meet an individual student's needs. On the other hand, private tutoring has also been criticized since it does not provide the student with the opportunity to develop social skills which is inherent in the classroom setting.

Although this traditional method of education has changed little over the years, the amount of information which students need to assimilate to be considered well educated continues to increase geometrically. This fact is graphically illustrated by the technological wonders which surround us such as microcomputers, DNA mapping, videophones, etc. The increase in information puts a correspondingly greater burden on teachers to try to cram more learning into the same amount of time, which leads to an associated increase in the amount of paperwork to be handled. Moreover, as fiscal resources grow more and more scarce, teachers have been required to handle even larger groups of students resulting in even less individual attention.

Although these problems are rapidly becoming more acute, they have been acknowledged by educators for many years. Many countries have reacted by adding more days to the school year or sending children to school at an earlier age so that students have more time to acquire the additional knowledge necessary. This solution, however, will only provide short term relief since there is only a finite amount of additional learning time which can be reasonably added to students' schedules, while our knowledge base will always continue to expand. Additionally, increasing the school year further aggravates the fiscal problem of education by requiring even greater economic resources and putting greater pressure on teachers.

Educators have also experimented with alternate teaching methods, such as self-study programs and videotaped lectures, to both more efficiently use teachers' time and to provide an element of individuality to a student's study program. Although these types of methods are somewhat successful at higher levels of education, they are generally ineffective at lower levels where younger students lack the discipline to teach themselves.

SUMMARY OF THE INVENTION

In accordance with the present invention, an interactive educational method has an object of providing a flexible alternative to the conventional classroom educational method which will relieve the teacher of many of the non-teaching burdens discussed above, while also giving the student the opportunity to learn at his or her own pace. The teacher will no longer have the repeated paperwork chores of preparing a daily lecture, preparing and grading homework, creating and grading tests, documenting each student's progress and performance or justifying their evaluation of the student to the parents.

This will free teachers to use their primary skills of providing individual instruction to students who have difficulty with different areas of learning. In other words, the role of the teacher will revert from administrator and public relations officer back to teacher.

Another object of the present invention in accordance with preferred embodiments of this novel educational method, is to provide a interactive, audio-visual system which will encourage each student to learn at his or her own individual pace. Moreover, each student will be provided with instructional reinforcement in the form of questions and his or her performance will be monitored by the system. If a student has difficulty with a particular area, the system will alert the teacher who can then provide additional help.

BRIEF DESCRIPTION OF THE DRAWINGS

These and other advantages and objects of the invention will become more apparent from the following detailed description of the preferred embodiments when read in conjunction with the attached Figures in which.

DETAILED DESCRIPTION OF THE PREFERRED EMBODIMENTS

Figure 1:
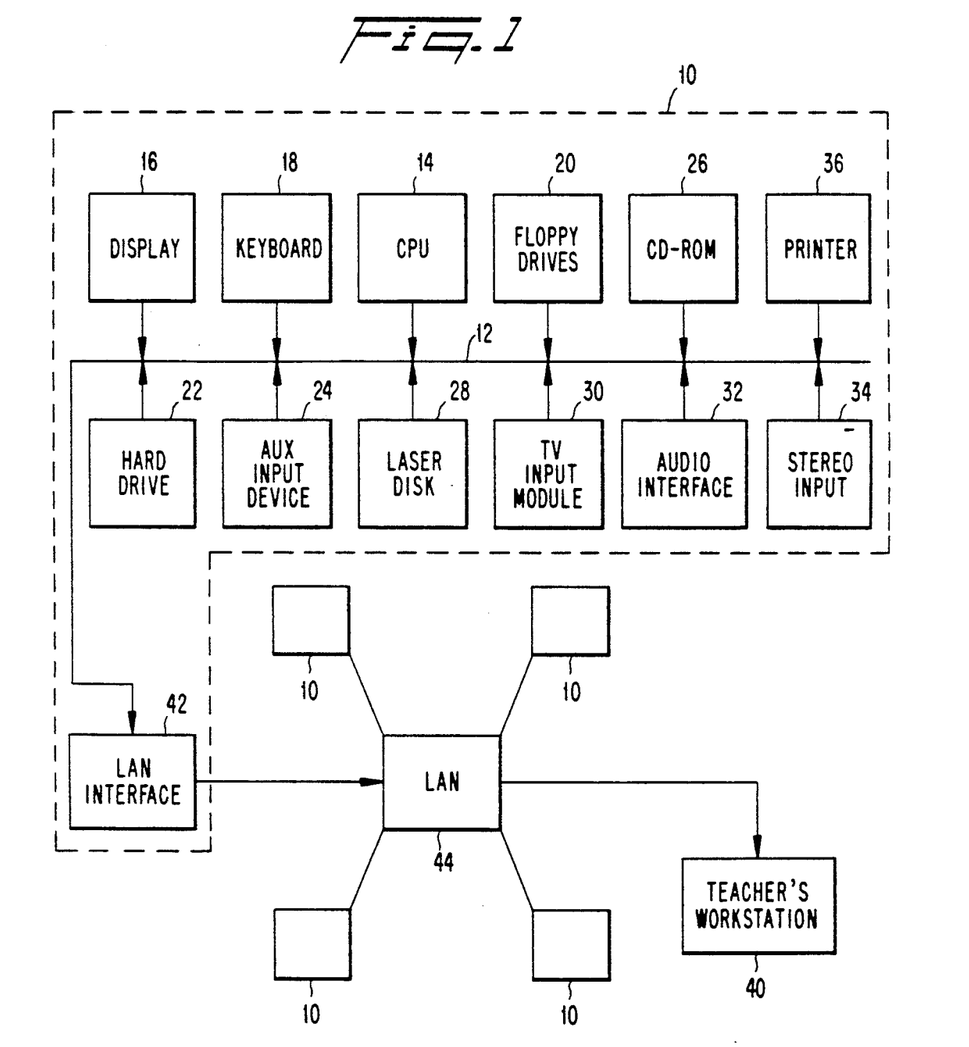
FIG. 1 illustrates a block diagram of the elements of a system for implementing the educational method according to an embodiment of the present invention.

A system for implementing the educational method according to a preferred embodiment of the present invention will be described with reference to FIG. 1. In this exemplary embodiment it is envisioned that each student will be provided with a workstation 10 that may comprise all of the devices indicated in block form within the dotted lines of FIG. 1 linked together via system bus 12. The workstation 10 can, for example, be an enhanced microcomputer and the CPU 14 could be that which is commonly associated with the enhanced microcomputer. For example, an IBM PC having an Intel 80386 microprocessor could provide the platform for the workstation. Alternately, more or less powerful computer systems could be used.

The workstation 10 can be integrated within or around an ergonomic environment. Each station can include an ergonomically designed chair (not shown) so that the student can remain comfortably seated for extended periods of time. The display 16, which can be a conventional VGA monitor attached via a serial port to the system bus 12, can be mounted within a student's desk under glass at about a 45 degree angle. Alternately, the display can simply rest on the desktop. In some preferred embodiments of the invention, the display will be touch sensitive so that a student can enter data and respond to questions from the computer via the screen.

The keyboard 18, floppy drives 20, and hard drive 22 are all conventional components attached Via suitable interfaces to the CPU 14. The auxiliary input device 24 can be any type of pointing device such as a mouse, digitizing tablet or light pen. The CD-ROM device 26 and laser disk 28, for providing text data and video data, respectively, are also of a conventional design and can be either built-in to the workstation or provided as stand-alone models.

Each of the TV input module 30, audio interface 32, and stereo input module 34 can be off-the-shelf boards which are designed to plug into the expansion slots of a microcomputer in a known manner. The TV input module 30 is a board which allows a computer to receive television signals via either antenna or cable and convert those signals into image signals which can be displayed on all or part cf the display 16. The audio interface 32 is an input/output board which allows the computer to send sounds, including voice and music, to a student via headphones (not shown) which plug into the board and receive such sounds via a microphone (not shown). Alternately, the audio interface could simply be a speaker which would be connected to a sound board and/or a voice synthesizer as is well known in the art. The stereo input module 34 is a board which allows the microcomputer to receive radio transmissions or signals from a tape player, CD player or any other type of audio device, which a student could listen to as background music. Printer 36 can be any type of microcomputer compatible printer, including dot matrix, inkjet or laser printer, which communicates with the CPU in a known manner.

All of the student workstations are in constant communication with a teacher's workstation 40 via a LAN interface 42 and local area network (LAN) 44. As described in more detail below, this real-time communication between student workstation and teacher workstation allows the teacher to be informed of the students' progress and activities as well as allowing the teacher to tailor instructional programs for each student.

The foregoing description will be understood by one skilled in the art as merely an example of one system which could be used to implement the various embodiments of the educational method of the present invention described in detail below and that various other configurations and devices could also be used. Reference to the conventionality of the various I/O devices described above is made merely to emphasize that one skilled in the art will recognize that the system described in FIG. 1 can be implemented using known interfaces and software packages.

Initially, one advantageous feature of the educational method according to the present invention is that courseware can be uniquely developed for each class, school, school system or any other segment of a student population so as to provide a curriculum desired by the educators using the system and method of the present invention. The term "courseware" as used throughout this specification is meant to comprise the combination of control programs and data which provide each lesson to the student at a workstation and includes, for example, both the information stored on the hard drive, laser disk, and CD-ROM, as well as that input through the TV input module, and the programmed presentation of that data. The phrase "lesson segment" is used to denote a block of material presented to a student which is intended to be viewed and interacted with in one sitting, typically 15-40 minutes. A lesson segment can also be a test which evaluates the student's retention of one or more lesson segments or a whole semester's worth of material.

As a simplified example, history courseware dealing with the American Revolution might comprise a plurality of lesson segments. One lesson segment might include, for example, a narrative story of George Washington's role in the revolution. The text of the story, read from the CD-ROM, might occupy one half of the display while illustrations, from the laser disk, occupy the other half of the screen. After each segment of the lesson, the program could test the student's comprehension by asking the student to answer a series of questions via the keyboard which relate to the previous segment of the lesson.

Thus the teacher or school system can select material including, for example, text, illustrations, length of lesson and questions to be answered, to comprise the courseware for any subject. This courseware development step in the educational method according to the present invention advantageously provides teachers and parents with the opportunity to create and update the educational material for presentation to the students.

One skilled in the teaching art will appreciate that many other teaching tools could be integrated into the courseware, in addition to those mentioned above, to present various topics. For example, some topics, such as biology, are particularly conducive to teaching via film presentation. This material can be input via the TV input module and displayed while an accompanying voice description is listened to by the student on the headphone set.

Figure 2:
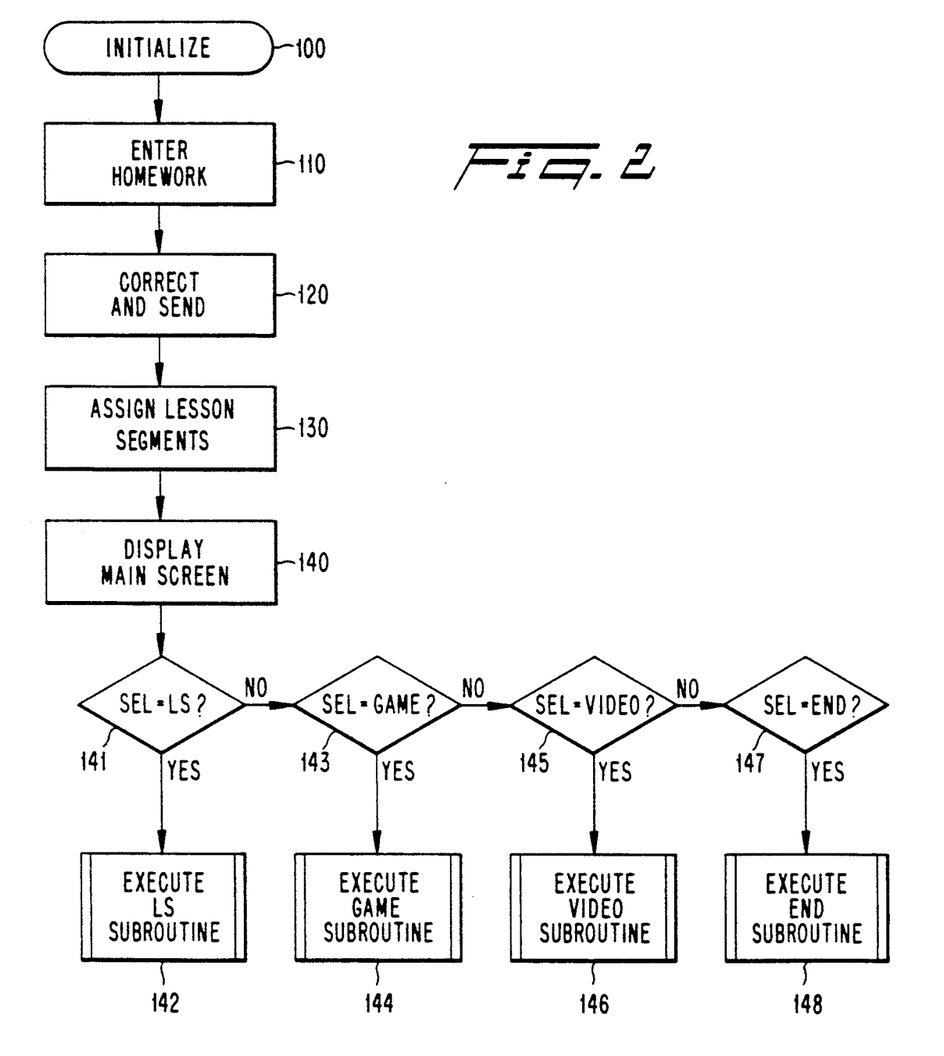
FIG. 2 sets forth a flow chart which indicates an overall sequence of events according to a preferred embodiment of an educational method according to the present invention.

Next, FIG. 2 illustrates an exemplary preferred embodiment of an overview of an educational method according to the present invention wherein the student is using the workstation and the system has been loaded with the developed courseware. In block 100, the teacher initializes the system and then the students enter their homework assignments from the previous day into the system at block 110. The homework assignment can be entered manually by the student typing the answers on the keyboard. Alternately, an optical scanning device (not shown) can be provided which is used to scan the homework paper and digitize the answers. In either case, the homework answers are compared to the expected answers by the CPU of each workstation and the results transmitted via the LAN to the teacher's workstation as indicated by block 120. The homework answers are stored in database files corresponding to each student name or ID number in the hard drive at the teacher's station for future use.

The teacher and/or a system program can then use the results of the homework assignments in conjunction with each student's progress, which has been stored in another database file at the end of the previous day, to assign lesson segments to each student as the process flow continues to block 130. This assignment process allows the teacher and/or a system program to determine how much and what type of material each student can access for a given period of time, and provides the first of several opportunities for the teacher and/or system program to tailor each student's individual learning program.

Within the system, this assignment process is controlled by the CPU of the teacher's station which downloads the control programs corresponding to the lesson segments selected by the teacher and/or a system program from the hard drive or other storage device of the teacher's workstation to the selected student's station through the LAN. Alternately, a single control program could be downloaded to the students' workstations which will allow selection of lesson segments already stored on the hard drive of each student's workstation. When run by the student these control programs access the various information storage devices to retrieve the audio and visual data created for each lesson segment.

In block 140, the process flow moves to the next step of displaying the main screen at each student work station. In addition to lesson segments, this screen can also include selections such as games, movies or educational video programs, and creative writing or drawing activities. These selections can also be chosen by the teacher, student, and/or a system program and can be downloaded through the LAN to each student workstation. As mentioned briefly above, depending on the educational level at which the system and method are being implemented, the student can make selections in a variety of ways. Younger students, for example, can make a selection by touching color-coded figures displayed on a touch-sensitive screen. More advanced students can make a selection by using the workstation's pointing device to click on the appropriate icon.

In decision blocks 141, 143, 145, and 147, the process flow checks to see which selection is made from the main screen. For exemplary purposes only, the choices of LESSON SEGMENT, GAME, VIDEO and END are illustrated in FIG. 2, however it is to be understood that many other different types of selections can be provided. Based on the determined selection, an appropriate subroutine 142, 144, 146, or 148 is executed. The LESSON SEGMENT selection will now be described with reference to FIG. 3 which illustrates an exemplary flowchart breaking down some of the steps of a lesson segment subroutine as diagrammatically indicated at block 142.

Figure 3:
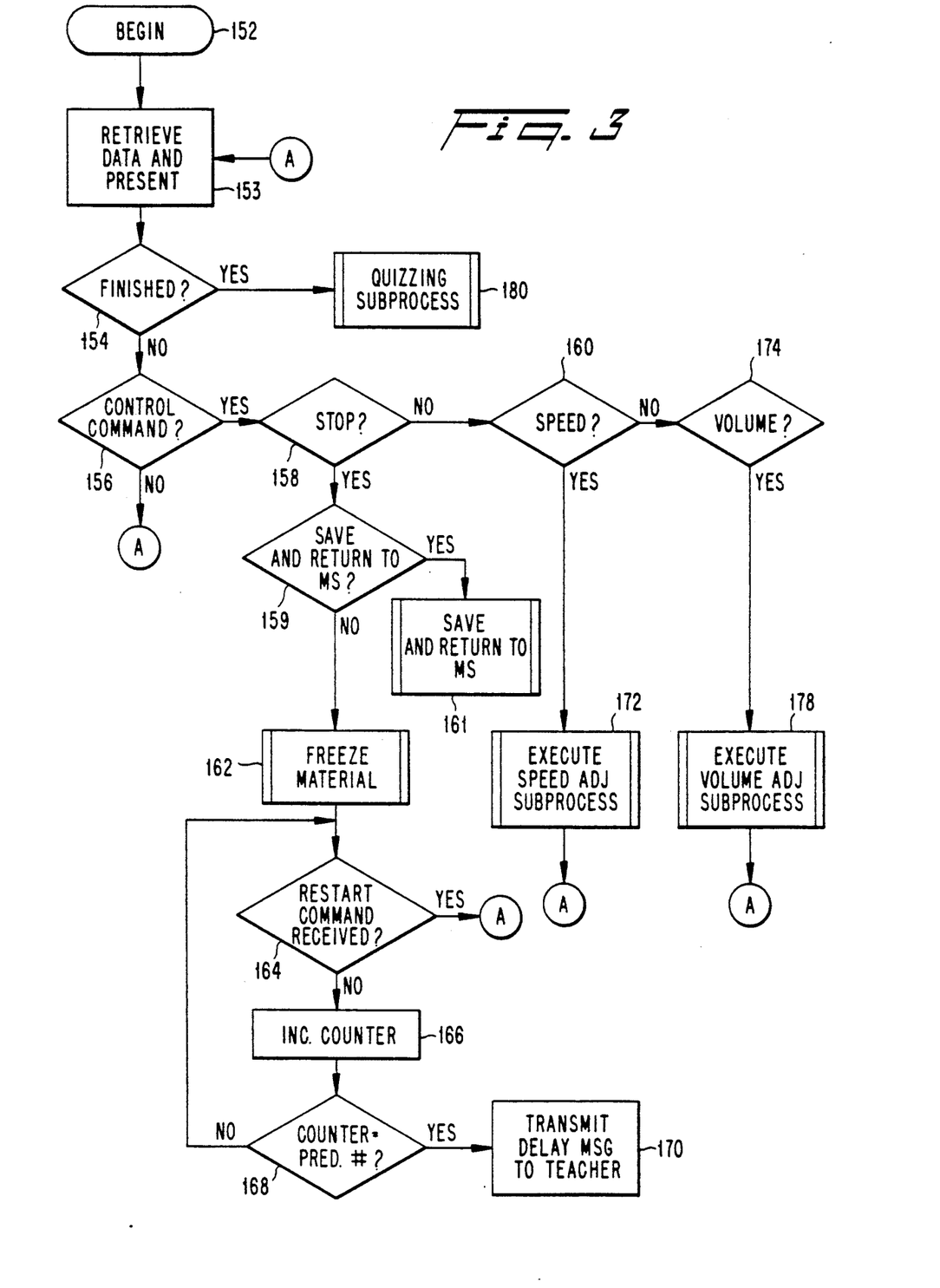
FIGS. 3 and 4 illustrate flowcharts describing subprocesses of the sequence described in FIG. 2.

A control program corresponding to the selected function which was previously stored on the hard drive or other storage device of the student's workstation during the assignment process is initiated in block 152. The student then watches and listens to the audio-visual presentation created by the control program as the process flow continues in block 153. The control program will also provide software control options for the student such as adjustment of speed or volume of the presentation and the ability to stop and restart the presentation so that the student can take a break or ask the teacher a question as discussed below.

At decision block 154 the control program checks to see if it has presented all of the material for the lesson segment. If so, the subroutine ends and the control program goes to block 180 in FIG. 3 to execute quizzing subprocess described below. If not, the control program polls various flag variables associated with the commands available to the student during the presentation as shown at decision block 156. If a flag has not been set, the control program loops back and continues displaying material at block 153 and then again checks if the lesson segment is over. If a flag has been set, indicating that the student wants to change or stop the presentation, the flow proceeds to a decision tree to implement the corresponding subroutine.

A first such exemplary subroutine is shown beginning at decision block 158, wherein it is asked whether the flag representing the STOP command was set. If not, the flow proceeds to the next command checking decision block 160. If the student has activated the stop command, the process flows to decision block 159 where the student is asked if he or she wishes to save the current position in the lesson segment and return to the main screen. If so, a pointer indicating a last displayed time frame in the lesson segment is stored and the process goes back to block 140 in FIG. 2. Otherwise the presentation is temporarily frozen at block 162. Next, the control program checks to see if the student has activated the restart command at decision block 164. If so, the process flow returns to block 153 and continues to display material in that loop. If not, a counter is incremented at block 166 and the count is compared, at block 168, to a predetermined number, for example, a number equal to 5 minutes, to see if the teacher should be notified of the delay. If the current number is equal to the predetermined number, a message is sent over the LAN to notify the teacher at block 170, otherwise, the process flow loops back to again check if the restart command has been given.

The SPEED and VOLUME control commands are checked for and implemented at blocks 160, 172, 174, and 178 in a similar manner. Since these functional subroutines are not themselves part of the present invention and are well known in the art, they are not described in further detail herein. Moreover, one skilled in the art will appreciate that a plurality of other commands can be made available to the student by simply adding such subroutines to the decision tree and providing icons or areas of a touch-sensitive screen which will set a flag corresponding to that function.

Figure 4:
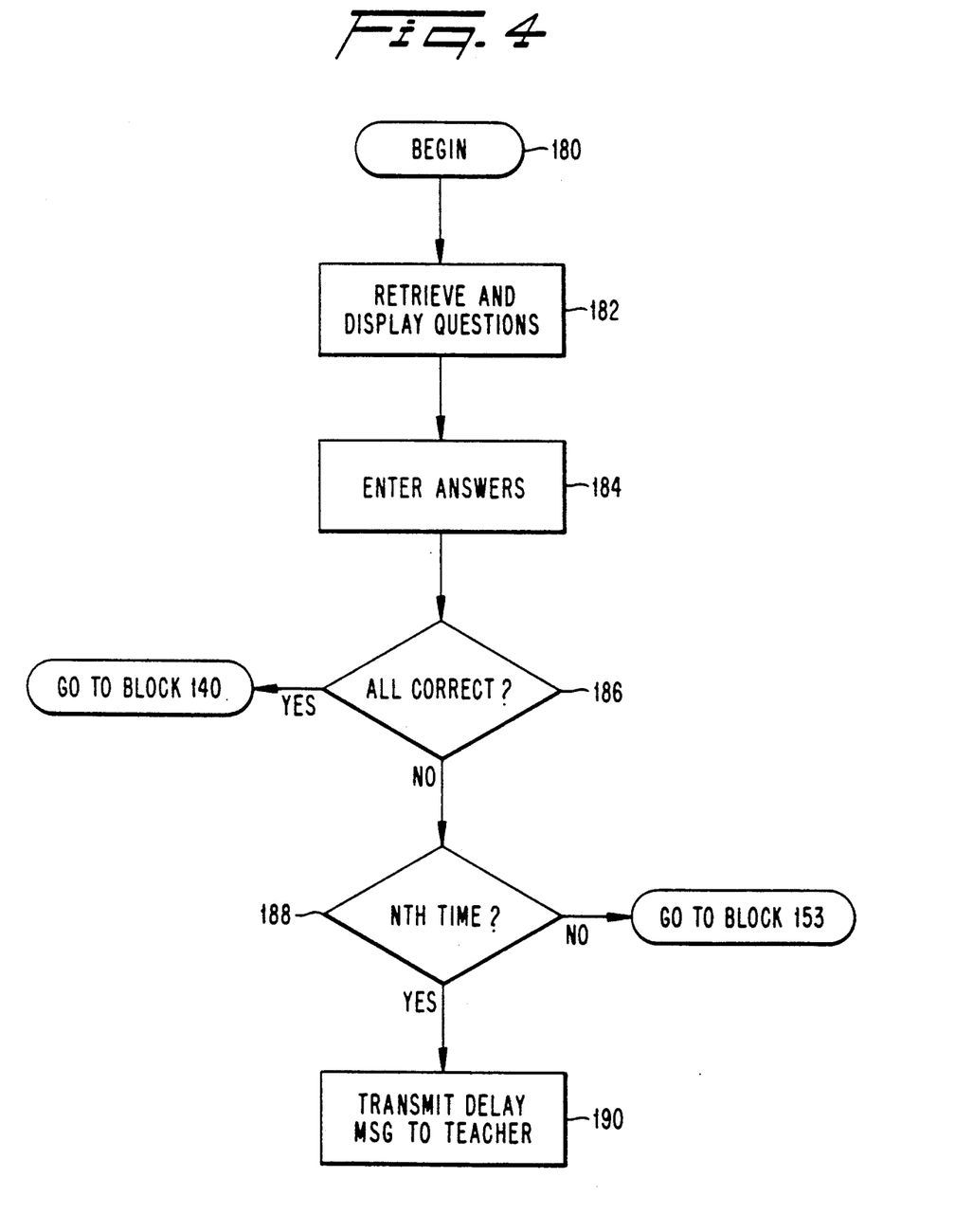

After a lesson segment has finished being presented, the control flow according to this exemplary embodiment of the present invention goes from decision block 154 to block 180 which executes a quiz subroutine illustrated in more detail in FIG. 4. At the end of each lesson segment, which can be designed at the courseware level to be of an optimal attention span length for the intended grade level of the student, typically there will be a series of questions retrieved from a database of questions associated with the particular lesson segment for the student to answer at block 182. The student enters his or her responses via the keyboard and the workstation CPU compares these responses to the correct answers stored in the database at blocks 184 and 186. If desired, a grade on the student's responses can be generated and transmitted to the teacher's station for storage in the student's file.

At decision block 186, if the student has correctly answered all of the questions the flow loops back to the main screen block 140 of FIG. 2, whereat the student can access another lesson segment, request recreational material, or end for the day. If the student has incorrectly answered some questions, the process flow loops back to block 153 of FIG. 3 and the program retrieves and replays only material relating to those questions which were missed. This replayed material could be excerpted from the original presentation or it could be new material specifically designed to explain the correct answer to each incorrectly answered question. The process of replaying this material includes all of the steps discussed above with respect to subroutine block 142 and the subroutines of FIG. 3.

After playing this remedial material, the same or different questions as those previously answered incorrectly will again be displayed and answered at blocks 182 and 184. The workstation CPU will again check the answers at decision block 186 and transmit the results to the teacher's station for storage. If all of the answers are correct, the process flow returns to the main screen block 140. If, however, after a predetermined number of tries the student still fails to grasp the material and answers some questions incorrectly, the process flows to block 190 and the student's workstation will send a message to the teacher's workstation indicating which material the student is having problems with. The teacher can then use his or her own methods to personally help the student to grasp the material.

In addition to lesson segments, blocks 144 and 146 generally indicate game and video subroutines, respectively, which can be selected by a student from the main screen if they have been sent to the student workstation by the teacher and/or a system program. These selections can be used to reward the student or merely to provide a break from the more educational materials. Like the lesson segment function described above, the selection of these functions initiates a control program which allows the student to play a game or watch a program for a predetermined time. After the predetermined time has elapsed, the program will return the student to the main screen where only lesson segment selections will be available so that the student can complete the assigned lessons for the day. Further detail regarding particular games and video programs and their control are beyond the scope of this disclosure and can be readily implemented using conventional means. Again it should be noted that games and videos are detailed herein only as examples of other functions which can be integrated into the system and method according to the present invention and that many other selections and functions can be readily implemented by one skilled in the art.

The END function which is recognized by decision block 147 and implemented at block 148 of FIG. 2 can be selected by the student at the end of the day or as a logoff feature if other students need to use the workstation. Housekeeping software will update the database files at the teacher's station regarding the student's activity during the session being terminated. Homework for the following day corresponding to the lesson segments completed during the session can be can be retrieved from memory and generated by the printer. Additionally, progress reports or remedial notes can be generated at the printer for the student to take home to his or her parents.

The teacher's workstation 40 can comprise a system similar to that of the student workstation 10 enhanced to provide sufficient processing resources to control the LAN and provide monitoring capabilities of each of the student workstations tied into the LAN. The teacher's workstation can include a more powerful CPU, larger on-board memory and a larger hard drive to store, for example, all of the various lesson segment control programs which can be assigned. In addition to the functions discussed above, the teacher's workstation also provides the teacher with other capabilities including, editing the databases associated with the materials and questions of the lesson segments and report generation features which allow the teacher to easily generate grade reports on any or all of the students using only a few keystrokes.

Although the foregoing description has been directed to an exemplary system for implementing the educational method according to the present invention, one skilled in the art will appreciate that many other systems or variations of the system described above could readily be configured to implement an educational method according to the present invention. For example, other types of memory storage devices and communication systems linking the student workstations to the teacher workstation could be readily implemented. Methods according to the present invention are also not limited to a single group of student terminals linked to a single teacher's workstation, but could include an entire school's workstations or more.

Moreover, one skilled in the art will readily appreciate that emerging multimedia technologies and computer developments readily lend themselves to integration with various embodiments of the present invention. For example, expert systems could be used as part of the courseware so that the system develops its own questioning and remedial presentation techniques. Moreover, the advent of computer voice synthesis and recognition provides another alternative for both student input and system audio output.

The foregoing description which sets forth exemplary preferred embodiments of a novel educational method and system for carrying out such a method is merely intended to be illustrative of the present invention rather than restrictive or limitive thereof. On the other hand, the scope of the invention is set forth in the appended claims which are intended to encompass what is directly set forth therein as well as reasonable equivalents thereof including those expressly and implicitly set forth in the disclosure.

What is claimed is:

1. An educational method which provides an interactive audio-visual system comprising the steps of:

developing courseware which presents audio-visual material in a desired manner;

loading said courseware into a plurality of student workstations and a teacher workstation;

selecting one of a plurality of presentation modes from a student workstation;

retrieving and presenting at the student workstation audio-visual material based on said selection step;

displaying, at the end of said presenting step, a plurality of questions based on said audio-visual material;

comparing answers to said questions to correct answers, retrieving and presenting, on the basis of said comparing step, audio visual material relating to questions incorrectly, and monitoring student progress and alerting the teacher of student need for remedial instruction.

2. The educational method of claim 1 further comprising the steps of:

entering assignment answers into the system; and grading and assignments by comparing the answers entered into the system with correct answers in the system.

3. The educational system of claim 2 wherein said step of entering assignment answers comprises the step of:

scanning said answers into the system.

4. The educational method of claim 1 further comprising the steps of:

printing progess and remedial action notices; and recording acknowledgements of these notices.

5. The educational method of claim 1 wherein said step of presenting material further comprises the step of:

providing audio instruction using voice synthesis techniques.

6. An interactive educational system comprising:

supervisory station means for monitoring the education system including:

first interface means for transmitting data to and receiving data from a student station means;

first output means for outputting data to a user of the supervisory station means;

first input means for inputting commands to the supervisory station means;

first memory means for storing data and programs used to operate the educational system; and first processing means, responsive to said first input means and said first interface means, for controlling the flow of data among said first interface means, the first input means, and said first output means; and student stations means for interacting with a user including:

second interface means for transmitting data to and receiving data from said supervisory station means;

second output means for outputting data to the user of the student station means station;

second input means for inputting commands to the student station means;

second memory means for storing data and programs used to operate the educational system; and second processing means, responsive to said second input means and said second interface means, for controlling the flow of data among said second interface means, said second input means, and said second output means;

wherein said second processing means is also for directing said second output means to output educational data and questions relating to said educational data, and for directing said second input means to receive answers to said questions;

wherein said second processing means is also for comparing said received answers with correct answers stored in said second memory means;

wherein said second processing means, based on a result of said comparison, is also for communicating said second output means to output remedial material related to, but not the same as, questions answered incorrectly.

wherein said second processing means is also for directing, after said remedial material has been output, said second output means to output questions related to those questions answered incorrectly and for directing said second input means to receive second answers to said related questions; and wherein said second processing means is also for comparing said second answers to correct answerers of said related questions and for sending a notice to said supervisory station means based on said comparison.

7. The interactive educational system of claim 6, wherein:

said first and second input means each comprise at least one of a touch-sensitive display, a pointing device, a keyboard, and an optical scanner;

said first and second output means comprise at least one of a display and an audio output device; and said first and second memory means comprise at least one of a hard disk drive, a laser disk drive, and a CD-ROM.

8. The interactive educational system of claim 6 wherein:

said first processing means is also for receiving progress data from said student station means relating to progress of said user at said student station means and for storing said progress data in said first memory means.

9. The interactive educational system of claim 8 wherein:

said first processing means is also for directing said first input means to receive operation selections from a user of said supervisory station means, wherein said operation selections comprise a report generation selection.

10. The interactive educational system of claim 9 wherein said supervisory station means further comprises:

means for generating tangible reports, wherein said first processing means, upon receipt of a report generation selection input from said first input means, is also for retrieving said progress data from said first memory means and for directing said generating means to print at least one report based on said progress data.

11. The interactive educational system of claim 8 wherein:

said first processing means uses a database program for storing said progress data in said first memory means.

12. An interactive educational system having a learning station and a supervisory station wherein:

said learning station comprises means for outputting educational information to a user, means for receiving educational input data from a user, means for processing said information and data, and means for communicating with said supervisory station; and said supervisory station comprises means for transmitting and receiving data to and from said learning station, means for analyzing an educational progress of said user based on said received data, means for outputting an indication of said educational progress, means for monitoring a student's progress during a particular period, and means for generating homework assignments based on said monitored progress.

13. The educational system of claim 12, wherein said supervisory station further comprises:
   means for storing and retrieving said received data; and
   means for selecting generating at least one report based on said received data.

14. The educational system of claim 13 wherein:
   said at least one report comprises one of a grade report and a remedial action notice.

15. The educational system of claim 12, wherein said student station further comprises:
   means for outputting said educational data as audiovisual information and questions relating to said educational data;
   means for comparing responses received from said educational input data means to correct responses; and
   means for outputting remedial material based on said comparison.

16. The educational system of claim 15 wherein said student station further comprises:
   means for outputting second questions related to said remedial material;
   means for comparing second responses received from said educational input data means to second correct responses; and
   means for notifying said supervisory station based on a result of said comparison.

17. The educational system of claim 12, wherein said means for generating homework further comprises:
   memory means for storing said homework assignments; and
   printing means for printing out said homework assignments;

18. An interactive educational system comprising:
   supervisory station means for monitoring the educational system including:
      first interface means for transmitting data to and receiving data from a student station means;
      first output means for outputting data to a user of the supervisory station means;
      first input means for inputting commands to the supervisory station means;
      first memory means for storing data and programs used to operate the educational system; and
      first processing means, responsive to said first input means and said first interface means, for controlling the flow of data among said first interface means, the first input means, and said first output means; and
   student stations means for interacting with a user including:
      second interface means for transmitting data to and receiving data from said supervisory station means;
      second output means for outputting data to the user of the student station means station;
      second input means for inputting commands to the student station means;
      second memory means for storing data and programs used to operate the educational system; and
      second processing means, responsive to said second input means and said second interface means, for controlling the flow of data among said second interface means, said second input means, and said second output means;
   wherein said second processing means is also for directing said second output means to output educational data and questions relating to said educational data, and for directing said second input means to receive answers to said questions.
   wherein said second processing means is also for comparing said received answers with correct answers stored in said second memory means;
   wherein said second processing means, based on a result of said comparison, is also for commanding said second input means to output remedial material related to questions answered incorrectly;
   wherein said second processing means is also for directing, after said remedial material has been output, said second output means to output questions related to those questions answered incorrectly and for directing said second input means to receive second answers to said related questions; and
   wherein said second processing means is also for comparing said second answers to correct answers of said related questions and for sending a notice to said supervisory station means based on said comparison.

19. The interface educational system of claim 18, wherein:
   said first and second input means each comprise at least one of a touch-sensitive display, a pointing device, a keyboard, and an optical scanner;
   said first and second output means comprise at least one of a display and an audio output device; and
   said first and second memory means comprise at least one of a hard disk drive, a laser disk drive, and a CD-ROM.

20. The interactive educational system of claim 18 wherein:
   said first processing means is also for receiving progress data from said student station means relating to progress of said user at said student station means and for storing said progress data in said first memory means.

21. The interactive educational system of claim 20 wherein:
   said first processing means is also for directing said first input means to receive operation selections from a user of said supervisory station means, wherein said operation selections comprise a report generation selection.

22. The interactive educational system of claim 21 wherein said supervisory station means further comprises:
   means for generating tangible reports, wherein said first processing means, upon receipt of a report generation selection input from said first input means, is also for retrieving said progress data from said first memory means and for directing said generating means to print at least one report based on said progress data.

23. The interactive educational system of claim 20 wherein:
   said first processing means uses a database program for storing said progress data in said first memory means.

* * * * *